US007878481B2

(12) United States Patent
Kallfass et al.

(10) Patent No.: US 7,878,481 B2
(45) Date of Patent: Feb. 1, 2011

(54) METHOD FOR TRIGGERING A PLURALITY OF VALVES, AND CONTROL BLOCK HAVING A PLURALITY OF VALVES

(75) Inventors: Ingo Kallfass, Bretten (DE); Reiner Kurz, Sachsenheim (DE); Gerhard Keuper, Leonberg (DE); Gerold Mueller, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 12/400,093

(22) Filed: Mar. 9, 2009

(65) Prior Publication Data

US 2009/0234508 A1 Sep. 17, 2009

(30) Foreign Application Priority Data

Mar. 11, 2008 (DE) ...................... 10 2008 013 602

(51) Int. Cl.
*F16K 31/02* (2006.01)

(52) U.S. Cl. ............................. 251/129.15; 137/487.5; 361/166; 361/167

(58) Field of Classification Search ............ 251/129.15; 137/487.5; 361/166, 167, 168.1, 169.1
See application file for complete search history.

(56) References Cited

U.S. PATENT DOCUMENTS

| | | | | |
|---|---|---|---|---|
| 4,662,605 | A * | 5/1987 | Garcia | 251/129.08 |
| 5,139,227 | A * | 8/1992 | Sumida et al. | 251/129.08 |
| 6,155,654 | A * | 12/2000 | Oyama | 303/117.1 |
| 6,619,612 | B2 * | 9/2003 | Freisinger et al. | 251/30.03 |
| 7,070,161 | B2 * | 7/2006 | Piehl et al. | 251/65 |
| 7,556,062 | B2 * | 7/2009 | Arnold et al. | 137/625.65 |
| 2009/0005913 | A1 | 1/2009 | Fernandez et al. | |
| 2009/0206292 | A1 * | 8/2009 | Popp et al. | 251/129.15 |

FOREIGN PATENT DOCUMENTS

DE 10 2004 048 706 4/2006

* cited by examiner

*Primary Examiner*—Erick Solis
(74) *Attorney, Agent, or Firm*—Michael J. Striker

(57) ABSTRACT

A plurality of valves are triggered so that a first valve is triggered by a first trigger signal and a second valve is triggered by a second trigger signal, the first trigger signal and the second trigger signal are each generated by generating a pulse width modulated frequency signal of the first frequency f1 and a dither signal of the second frequency f2, where f1>f2, the trigger signal is generated by modulating the clock pulse duty factor of the frequency signal with the dither signal, and the dither signals of the first trigger signal and of the second trigger signal are synchronized with one another at chronological intervals.

20 Claims, 3 Drawing Sheets

METHOD FOR TRIGGERING A PLURALITY OF VALVES, AND CONTROL BLOCK HAVING A PLURALITY OF VALVES

CROSS-REFERENCE TO RELATED APPLICATION

The invention described and claimed hereinbelow is also described in German Patent Application DE 10 2008 013 602.6 filed on Mar. 11, 2008. This German Patent Application, whose subject matter is incorporated here by reference, provides the basis for a claim of priority of invention under 35 U.S.C. 119(a)-(d).

BACKGROUND OF THE INVENTION

The invention relates to a method for triggering a plurality of valves and to a control block having a plurality of valves, in particular for mobile driven machines. From German Patent Disclosure DE 10 2004 048 706, it is known to trigger a magnet valve using a pulse width modulated (PWM) control signal.

To prevent the armature of the magnet valve from seizing in a particular position because of static friction, the control signal is acted upon by a low-frequency, so-called dither signal. This signal changes the duty factor of the control signal, so that seizing of the armature is prevented.

DE 10 2004 048 706 describes the problem of an unwanted fluctuation in the magnetic current, which can even damage the hydraulic system. For this reason, the PWM control signal and the dither signal are generated independently of a main control loop.

In mobile driven machines, for example, a plurality of hydraulic valves are often combined into control blocks. It has then been found that low-frequency fluctuations occur, with a frequency typically in the sub-Hertz range, for example from approximately 0.1 Hz to 0.001 Hz. These fluctuations cannot be regulated at all, or only with great difficulty, and lead to unwanted oscillations in the triggered consumer.

Tolerance-caused differences in frequency in the oscillating quartzes of the various valve electronics units are suspected to be the cause of the fluctuations.

SUMMARY OF THE INVENTION

It is the object of the invention to furnish a method for triggering a plurality of hydraulic valves in which the unwanted fluctuation is reduced. It is a further object of the invention to furnish a control block having a plurality of valves, in which the unwanted fluctuation is reduced.

The invention furnishes a method for triggering a plurality of valves in which a first valve is triggered by a first trigger signal and a second valve is triggered by a second trigger signal. The valves may be hydraulic valves or pneumatic valves. The first trigger signal and the second trigger signal are each generated by the following steps: First, a pulse width modulated frequency signal of the frequency f1 and a dither signal of the frequency f2 are generated, where f1>f2.

The trigger signal is generated by modulation of the clock pulse duty factor of the frequency signal with the dither signal. The dither signals of the first trigger signal and of the second trigger signal are synchronized with one another at chronological intervals. The synchronization prevents overly great phase differences from occurring between the dither signals and prevents fluctuation from being able to develop. If more than two valves are provided, then the dither signals of all the valves are synchronized with one another. Synchronization means that the signals are put in a predetermined phase position relative to one another.

Thus in the case of valves that are provided together in one control block, it is assured that the unwanted fluctuation cannot occur, and the possibility that the unwanted low-frequency fluctuation can induce the consumer to oscillate is averted. In the known valve blocks in mobile hydraulics, an oscillation, for instance via a common control oil supply conduit, can be propagated from one valve to adjacent valves. If an inducement to oscillation is present in the latter as well, the result can be the development of low-frequency fluctuation that is visible in the oil stream of the triggered consumers. Influencing the transmission of the oscillation is difficult and complicated. By the synchronization according to the invention of the dither signals, the cause of the fluctuation, namely drifting apart of the dither frequencies, is conversely effectively suppressed.

The method is advantageous, compared to signal generation in which the frequency signals and dither signals for each valve are generated entirely independently of the other valves. However, advantages also exist compared to central generation of the dither signals. For instance, generating the dither signal and the frequency signal can be integrated with the valve electronics of each valve, and the valve can be triggered via a simple interface or field bus. The control block can be configured and expanded substantially more simply. Moreover, when generation is done centrally, care must be taken to assure that the transit times of the dither signal to the various valves not differ.

If the signal for synchronizing the dither signals is generated based on a command from an external control unit, then the control of the individual valve controllers, which merely need to wait passively for the synchronization command and do not have to trip that command, becomes simpler.

Alternatively, the signal for synchronizing the dither signals is generated by the controller of one of the valves. This controller acts as a master with regard to the dither cycle. No external control is needed.

In one embodiment, the frequency signal and the dither signal for the first valve are generated by a first quartz, and the frequency signal and the dither signal for the second valve are generated by a second quartz. In general, quartzes make clock signals with very precise frequencies available and are therefore especially suitable as clock generators for the frequency signal and the dither signal.

By changing the frequency of the dither signals to a frequency of f3 where f3≠f2, during the synchronization of the dither signals, the synchronization is effected quite quickly, without requiring that the clock pulse duty factor of the dither signal be changed. Conversely, if the clock pulse duty factor of the dither signal should have been changed, then the slide of the valve would move out of its central position for a longer time.

An adaptation of the phase of a dither signal, performed after a synchronizing signal is received, can bring about a very fast correction, but under some circumstances it may have a marked influence on the triggered consumers.

If the synchronization of the dither signals takes place at intervals that correspond to a multiple of the dither frequency f2, then it is assured that in each case, the synchronization is effected at similar phase positions of the dither signal. Thus the synchronization lasts approximately the same length of time in each case. The multiple is for instance 1000, so that in a typical dither period of 7 milliseconds, the dither signals are synchronized approximately every 7 seconds. Preferably, these synchronization intervals are predetermined as a function of a tolerance-caused difference in frequency between the quartzes used. The synchronization intervals are expediently shorter than a fluctuation period length that is determined by the frequency difference.

In one embodiment, the phase position of the dither signal is first ascertained, and a decision is then made as to whether a frequency f3>f2, or a frequency f3<f2, will be set. Thus it can be decided whether the dither signal can be synchronized faster by lengthening the period length, or shortening it.

In a further embodiment, the valves are synchronized in such a way that the dither signals each have phase spacings of p=360°/A to one another, and A is the number of valves. Thus the valves are acted upon, as uniformly offset in time as possible, by the dither signal resulting in fewer mutual influences from the common control oil supply of the valves.

The invention also furnishes a control block having a plurality of valves. The control block has a first circuit for generating a first trigger signal for triggering a first valve and a second circuit for generating a second trigger signal for triggering a second valve. The first circuit and the second circuit each have a first signal generator for generating a pulse width modulated frequency signal of the frequency f1 and a second signal generator for generating a dither signal of the frequency f2, where f1>f2.

A modulator serves to modulate the clock pulse duty factor of the frequency signal with the dither signal and to output the respective first trigger signal and second trigger signal. The dither signals of the first and second valve are synchronized with one another at chronological intervals.

The first circuit and the second circuit each form local clock generators for a valve. The local provision of the clock generator has the advantage that the transit times from the signal generation to the valve are short, so that transit time variations need not be taken into account. Moreover, the generation of the dither signal and of the frequency signal is integrated with the valve electronics of each valve, so that the valve can be triggered via a simple interface or field bus. The control block can be configured and expanded substantially more simply.

The synchronization prevents a fluctuation, generated by different dither signals, from likewise inducing the triggered consumers to oscillation.

Preferably, the first circuit and the second circuit each have a quartz, so that they furnish as stable as possible a fundamental frequency for the first and second signal generators. The invention is especially well suited to control blocks whose valves are supplied from a common oil supply.

Preferably, in at least one of the circuits, for instance in the second circuit, there are means for receiving a synchronization signal (K) as well as means, communicating with them, for varying the phase or frequency of the dither signal (S2). The valve electronics, which represent one exemplary embodiment for the circuit, for instance have a microcontroller. Its communications interface assures the reception of the synchronization signal. The microcontroller furthermore fixes the required synchronization action and controls the generation of the dither signal accordingly.

In control blocks which have valve blocks each with a pilot control valve and a main valve triggered by the pilot control valve, the pilot control valve is triggered by the respective trigger signal.

A synchronization circuit serves to generate a command for synchronizing, and in one embodiment, this synchronization circuit is provided in the first circuit or in the second circuit. The first circuit serves as a master for the dither frequency of the second circuit. In other words, instead of a central synchronization circuit, the valve electronics of one of the valves takes on the task of furnishing the synchronization signals.

The invention also relates to the use of a control block according to the invention in a mobile driven machine, such as a dredger or an agricultural machine such as a tractor. By the use of the control block, the unwanted fluctuations in the mobile driven machines are prevented.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
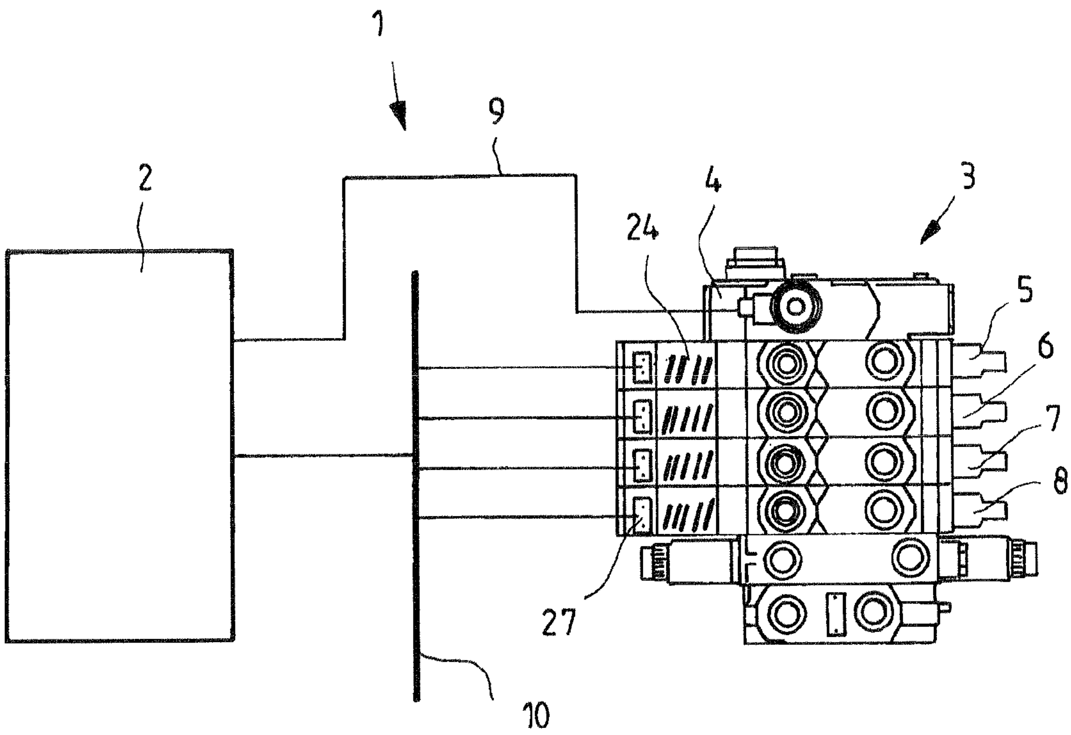
FIG. 1 shows a control device for a plurality of valves in accordance with the present invention.

FIG. 1 in a schematic view shows a device 1 for triggering a plurality of valves. It has a control unit 2 as well as a control block 3. The control block 3 has a first valve block 5, a second valve block 6, a third valve block 7, a fourth valve block 8, and a pressure reduction valve 4. The valve blocks 5, 6, 7 and 8 are each accommodated in disklike valve housings that are mounted side by side. The valve blocks 5, 6, 7 and 8, because of their structural design, are often also called valve disks. The construction described is typical for hydraulic control blocks in mobile driven machines.

In each of the valve housings of the valve blocks 5, 6, 7 and 8, one digital electronics unit 27 and one pilot control valve 24 are provided, shown on the left-hand side of the valve housing in FIG. 1. The digital electronics unit 27 communicates via the CAN (for Controller Area Network) bus 10 with the control unit 2. The control unit 2 is moreover in communication with the pressure reduction valve 4 via the electric lines 9.

The single pressure reduction valve 4 supplies the control oil pressure to the valve blocks 5, 6, 7 and 8, so that all the valve blocks 5, 6, 7 and 8 are connected jointly to one control oil supply.

Figure 2:
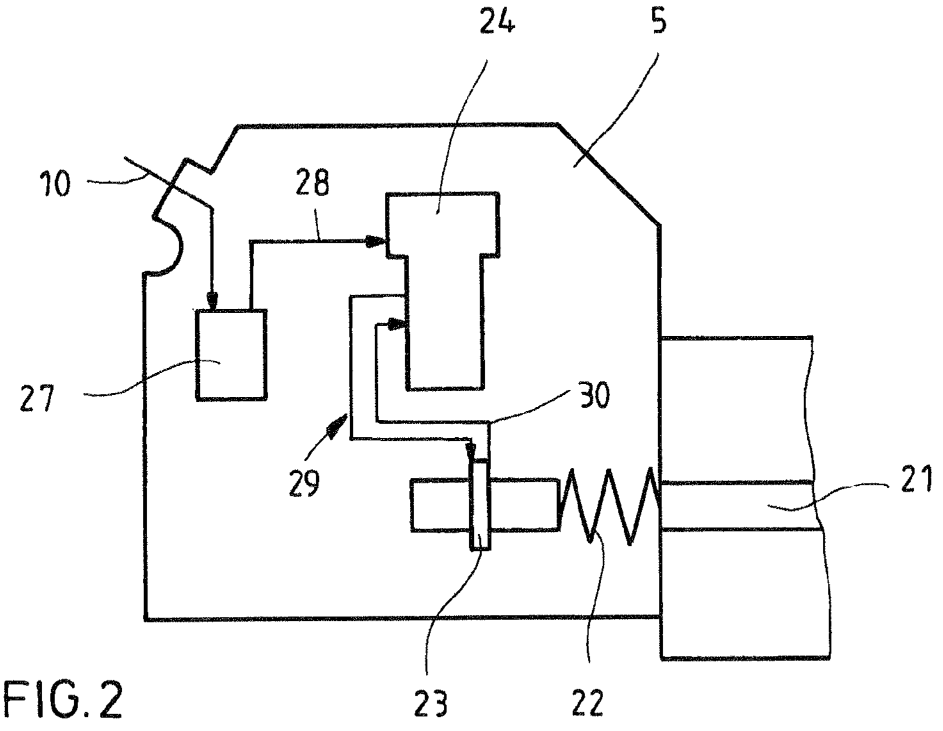
FIG. 2 shows details of the device of FIG. 1 in accordance with the present invention.

FIG. 2 shows details of the valve block 5 in cross section; it should be noted that in the control block 3, the valve blocks 6, 7 and 8 are each constructed like the valve block 5. The valve block 5 includes the digital electronics unit 27, the pilot control valve 24, the control piston 23, the restoring spring 22, and the valve slide 21. The control piston 23, the restoring spring 22 and the valve slide 21 are part of the main valve, which is triggered hydraulically by the pilot control The digital electronics unit 27 receives commands from the CAN bus 10 and triggers the electrohydraulic pilot control valve 24 via the electrical connection line 28. The pilot control valve 24 triggers the control piston 23 hydraulically via the oil delivery line 29 and the oil return line 30, so that this piston, together with the valve slide 21, is moved to the right or left.

Figure 3:
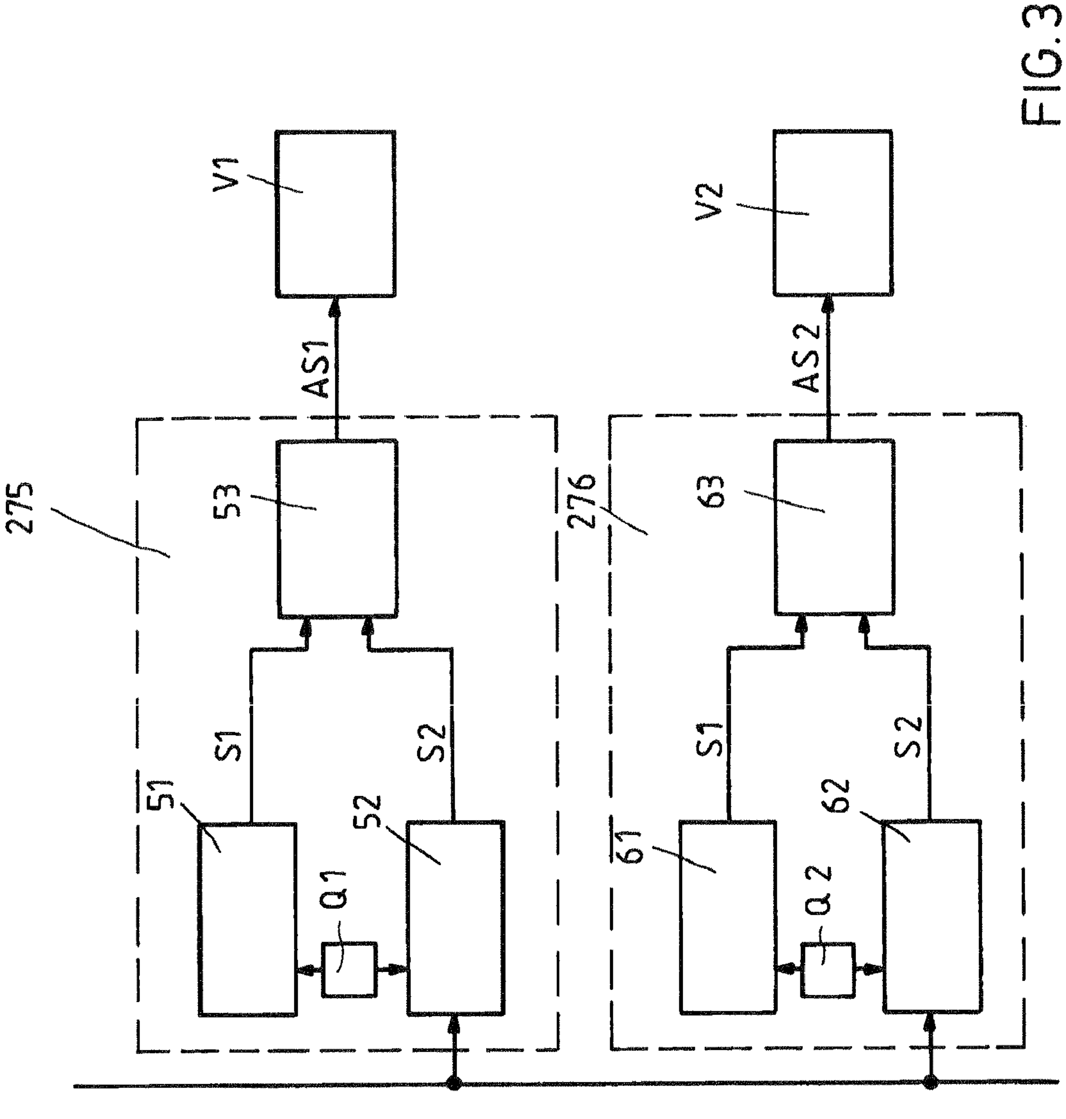
FIG. 3 shows trigger signals for valves of the device of FIG. 1 in accordance with the present invention.

FIG. 3 shows the generation of the trigger signals for the pilot control valves 24. The pilot control valve 24 of the valve block 5 is marked V1 here, while the pilot control valve 24 of the valve block 6 is marked V2. These valves are each triggered by means of the electrical signals AS1 for the pilot control valve V1 and AS2 for the pilot control valve V2. The generation of the trigger signals AS1 and AS2 is done in the digital electronics unit 275 of the valve block 5 and the digital electronics unit 276 of the valve block 6. The digital electronics unit 275 of the valve block 5 has a first signal generator 51 and a second signal generator 52, which are each triggered by a first quartz Q1.

The first signal generator 51 outputs a frequency signal S1, while the second signal generator 52 outputs a dither signal S2. These two signals S1 and S2 are combined in the modulator 53 and output by the modulator 53 as the first trigger signal AS1. The first signal generator 51 outputs a pulse width modulated frequency signal S1 having a frequency f1 of 2 or 8 kHz, or the second signal generator 52 generates the square-wave dither signal S2 having a frequency f2=140 Hz. The signal generators 51 and 52 receive a clock signal having a fixed frequency from the quartz Q1, in order to generate the signals S1 and S2 from the clock signal by dividing the fixed frequency.

In a further embodiment, the second signal generator 52 receives its clock signal not directly from the quartz Q1 but rather from the first signal generator 51, in order to generate the dither signal S2 from the clock signal by dividing the frequency f1 of the frequency signal S1.

The second digital electronics unit 276 likewise has a first signal generator 61, a second signal generator 62, a second quartz Q2, and a modulator 63. It should be noted that the first signal generators 51 and 61 are structurally identical to one another, which is precisely true as well for the second signal generators 52 and 62, the first and quartzes Q1 and Q2, and the modulators 53 and 63.

Because of the structural identity of the elements, the first trigger signal AS1 and the second trigger signal AS2 would actually have to be identical with regard to frequency, amplitude, phase, and clock pulse duty factor. Since the first quartz Q1 and the second quartz Q2, as independent frequency generators, have slight deviations from one another resulting from their manufacture, this can lead to differences in the first trigger signal AS1 from the second trigger signal AS2. It is assumed that as a result, the common pilot control oil pressure of the control block is induced to oscillation. This in turn causes a low-frequency oscillation, triggered by the valve blocks 5, 6, 7 and 8, in the frequency range from 0.1 Hz to 0.001 Hz in the oil stream of the consumers.

Such oscillation, also called fluctuation, can either not be eliminated at all or can be eliminated only with great difficulty. At a high gain factor of the control chain, the fluctuation is even visible at the consumer. For instance, in a hydraulically driven blower, an unintended variation in the set rpm occurs.

The clock pulse duty factor of the trigger signal AS1 indicates whether and to what extent the main slide, which is triggered by the first valve V1, is moved away from a central position. For instance, at a clock pulse duty factor of 50%, the main slide remains in a central position. At a clock pulse duty factor of 60%, it is displaced in a first direction, and at a clock pulse duty factor of 40%, it is displaced in a second direction.

To reduce the static friction, the clock pulse duty factor of the first trigger signal AS1 is varied with the aid of the dither signal S2 in the modulator 53. The dither signal is a digital, binary signal that has the value of either 1 or 0. At the value of 0, the clock pulse duty factor is reduced by a few percent, and at a value of 1, the clock pulse duty factor is increased by the same amount.

For instance, the frequency signal S1 has a clock pulse duty factor of 50%, so that the main valve slide remains in a central position. The dither signal S2 is a periodic signal, which is at the value of 1 for one-half of a clock period T and then is at the value of 0 for one-half of the clock period T. The period length T is obtained from the reciprocal of the frequency f2, which in this example is 140 Hz.

In the modulator 53, the clock pulse duty factor of the frequency signal S1 is modulated by means of the dither signal S2. If the value of the dither signal is 1, the clock pulse duty factor of the trigger signal AS1 that is output is set at 52%, while conversely the clock pulse duty factor is set at 48%, if the dither signal S2 has the value of 0. The thus-modulated trigger signal AS1 causes the main slide to oscillate about the central position.

To prevent the mutual influence of the valve blocks 5 and 6 from the drifting apart of the trigger signals AS1 and AS2, the dither signals are synchronized from time to time. To that end, via the CAN bus 10, a suitable command K is output to the two signal generators 52 and 62.

Figure 4:
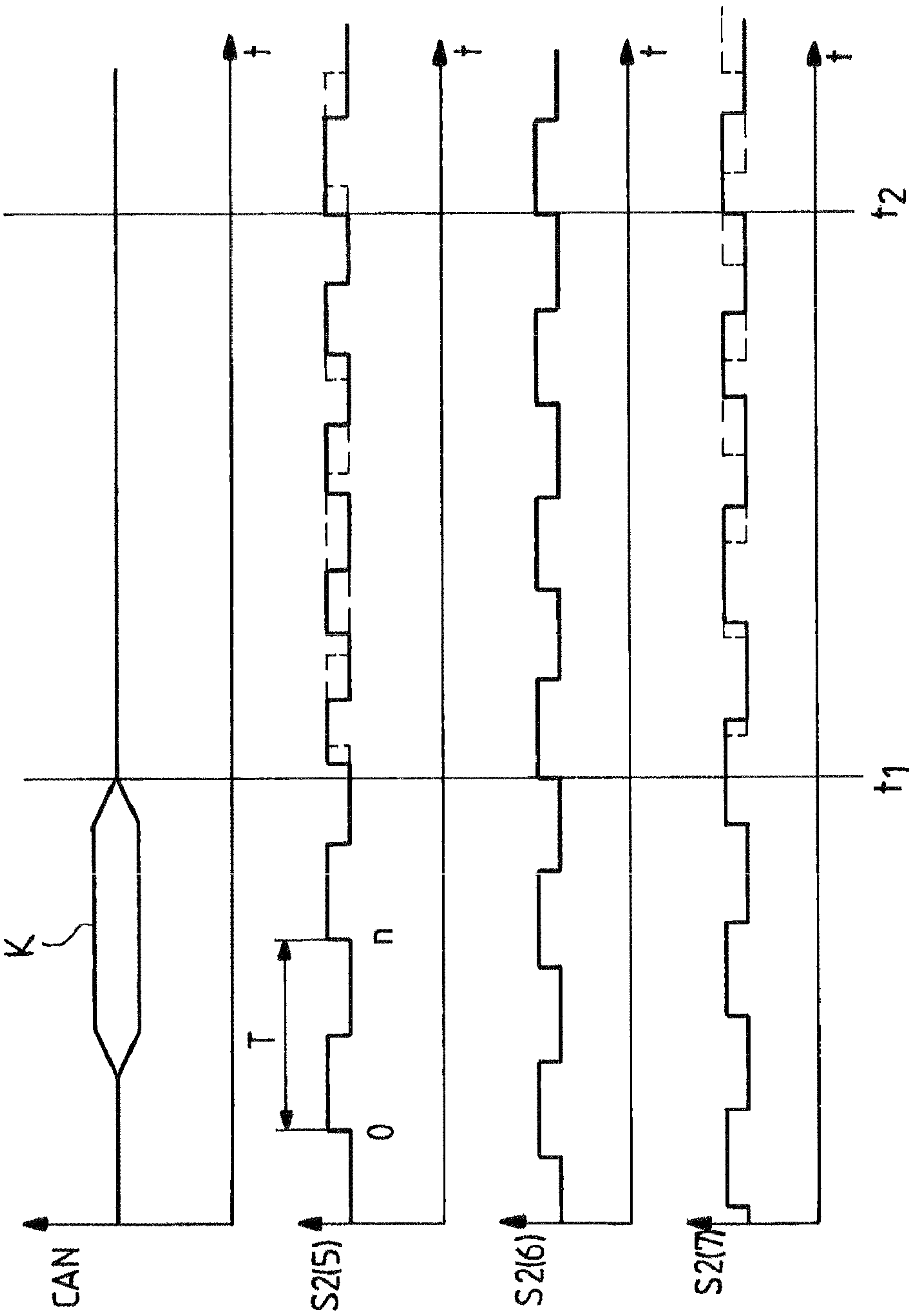
FIG. 4 shows signal courses of the trigger signals in FIG. 3 in accordance with the present invention.

FIG. 4 shows the signal courses of the signals of FIG. 3 over time. In the upper graph, the activity on the CAN bus 10 is shown. The second graph shows the signal course of the dither signal S2 of the first valve block 5, the third graph shows the signal course of the dither signal S2 of the second valve block 6, and the fourth graph shows the corresponding signal course in the third valve block 7. In the time period from 0 to t1, the dither signals S2 of the valve blocks 5, 6, 7 are not synchronous with one another, because the dither signals S2 have been generated separately for a relatively long period of time.

Via the CAN bus 10, a command K is output to the second signal generators; the command is received by all the second signal generators at time t1 and decoded.

Next, in each second signal generator, it is ascertained what the phase position of the dither signal is with respect to the synchronization signal. The clock period T of each dither signal is subdivided into n time segments of equal length, where n is a natural number greater than 1. The position inside the dither period T is characterized by the counter state of a periodic counter. To that end, during each period T, a counter also runs in each second signal generator 52 and 62 and indicates which step, from 1 to n, the dither signal S2 is located in just at that time.

At time t1, the command K is received by the CAN bus 10 and decoded in the various second signal generators. The current counter state at time t1 is stored in memory. In the exemplary embodiment, n has been selected to be 12. The counters for the valve blocks 5, 6 and 7 are at 10, 1, and 3, respectively. Each set of valve electronics now performs a change in its dither frequency on the specification of the ascertained deviation.

The second signal generator 62 of the valve block 6 no longer needs to be synchronized, since its counter at time t1 is at 1. In the case of the dither signal S2 of the valve block 5, it is ascertained that synchronizing is faster by shortening the dither period than by lengthening it. Consequently, in the period of time from t1 to t2, the period length of the dither signal is shortened.

In FIG. 4, dashed lines indicate the dither signal without synchronization, while solid lines show the dither signal with synchronization.

In the valve block 7, conversely, the period of the dither signal S2 is lengthened, until the dither signal S2 is synchronized. In the present example, this is the case at time t2=t1+3*1/f2. From that time t2 onward, the dither signals S2 of the valve blocks 5, 6 and 7 are each synchronized again. From time t2, the second signal generators return to the original frequency f2. In each second signal generator, the phase position of the dither signal after the synchronization, relative to the phase position before time t1, is stored in memory. The phase difference thus formed is taken into account in the ensuing periods of the dither signal.

It should be noted that the synchronization is done at such short intervals that the phase differences among the dither signals do not become overly great. The phase differences, shown in FIG. 4, of the dither signals S2 are selected to be relatively great for the sake of illustration.

Synchronization means either that the dither signals each have predefined phase differences from one another, or that for all the valves, the dither signals are set to be in-phase; that is, the phases of all the dither signals are identical.

If a phase difference is desired, this difference should advantageously be selected such that the phases of the dither signals S2 for the individual valve blocks 5, 6, 7 and 8 are distributed uniformly over a dither period. This means that the phase offset is set to be dependent on the number of valves that are in operation. If the control block 3 has two valve blocks 5 and 6, the phase offset of the dither signals S2 is set at 180°; that is, the dither signal S2 of the valve block 5 is phase-offset by 180° from the dither signal S2 of the valve block 6.

If there are three valves, the dither signals are phase-offset from one valve block to the next by 120° each; if there are four valve blocks, the phase offset from one valve block to the next is then 90°. The phase offset is stored in memory in each second signal generator 52 or 62. This signal generator indicates what the phase difference from an external clock is. The phase offset from one valve block to the next valve block is thus calculated in general in accordance with the calculation rule 360°/A, where A is the number of valve blocks. It is understood that the proposed method can also be used for valve blocks in which, instead of a pilot control valve and a main valve, a directly controlled electrohydraulic valve is provided.

The command K on the CAN bus 10 need not necessarily be synchronous with the dither period or a multiple of the dither period. The spacings between the intervals may vary. Versions are also possible in which the master dither signal, or a synchronization signal with a time stamp, is used. In the case of the master dither signal, the digital electronics unit 27 of one of the valve blocks sends the command K for synchronization to the digital electronics units 27 of the other valve blocks.

In FIG. 4, it is shown that lengthening or shortening the period length of the dither signal S2 is preferably done symmetrically. "Symmetry" here means that even during the synchronization phase from t1 to t2, the dither signal overall should be just as long at the high level 1 as at the low level 0, so that there is the least possible influence on the oil stream. Moreover, the variation of the period length should be selected to be so slight that the dither frequency varies only within a range that is permissible for that valve.

For the synchronization, no additional provisions in the valves or in the electronics hardware are required. All that is necessary is a message, valid for all the valves, on the serial bus. This must be sent often enough that the unwanted phase displacements of the dither signals S2 are corrected in good time, and no fluctuation can develop. The synchronization intervals are thus expediently selected to be less than the period length of the fluctuation. The fluctuation frequency can be ascertained from the production variation for the quartzes used.

It will be understood that each of the elements described above, or two or more together, may also find a useful application in other types of methods and constructions differing from the types described above.

While the invention has been illustrated and described as embodied in a method for triggering a plurality of valves, and control block having a plurality of valves. It is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method of triggering a plurality of valves, comprising the steps of triggering a first valve by a first trigger signal; triggering a second valve by a second trigger signal; generating the first trigger signal and the second trigger signal each by generating a pulse width modulated frequency signal of a first frequency and a dither signal of a second frequency wherein the first frequency is greater than the second frequency, generating the trigger signal by modulating a clock pulse duty factor of the frequency signal with the dither signal; and synchronizing the dither signals of the first trigger signal and of the second trigger signal with one another at chronological intervals.

2. The method as defined in claim 1, further comprising generating a signal for synchronizing the dither signals by a controller of one of the valves.

3. The method as defined in claim 1, further comprising generating a signal for synchronizing the dither signals by a central control unit.

4. The method as defined in claim 1, wherein said generating the frequency signal and the dither signal for the first valve by a first quartz; and generating the frequency signal and the dither signal for the second valve by a second quartz.

5. The method as defined in claim 4, wherein said generating includes generating of the dither signal for the first valve by dividing a frequency of the frequency signal for the first valve.

6. The method as defined in claim 5, further comprising during the synchronization of the dither signals, changing a frequency of the at least one of the dither signals to a further frequency, where the further frequency is not equal to the second frequency.

7. The method as defined in claim 2, further comprising effecting an adaptation of a phase of at least one of the dither signals at a time derived from the signal for synchronizing the dither signals.

8. The method as defined in claim 1, further comprising effecting the synchronization of the dither signals at the chronological intervals that corresponds to a multiple of the second dither frequency.

9. The method as defined in claim 4, further comprising effecting the synchronization of the dither signals at the chronological intervals which are predetermined, in accordance with a tolerance-caused difference in frequency between the first quartz and the second quartz.

10. The method as defined in claim 6, further comprising, upon the synchronization of the dither signals, making a decision depending on a phase position of the dither signals, whether the additional frequency greater than said second frequency or the additional frequency smaller than the second frequency will be set.

11. The method as defined in claim 1, further comprising synchronizing the valves such that the dither signals of the first valve have a phase spacing from the dither signal, and the phase spacing is equal to 360°/A, where A is a number of the valves.

12. A control block, comprising a plurality of valves including a first valve and a second valve; means for generating a first trigger signal for triggering said first valve; means for generating a second trigger signal for triggering said second valve; means For generating a pulse width modulated frequency signal of a first frequency; means for generating a dither signal of a second frequency where the second frequency is greater than the first frequency; means for modulating a clock pulse duty factor of the frequency signal with the dither signal and for outputting the respective trigger signal; and means for synchronizing the generation of the first trigger signal and of the second trigger signal with one another at chronological intervals.

13. The control block as defined in claim 12, wherein said means for generating the first trigger signal for the first valve and the second trigger signal for the second valve include a first circuit and a second circuit correspondingly, said means for generating the pulse width modulated frequency signal and for generating the dither signal include first and second signal generators, a modulator is provided for modulating the clock pulse duty factor of the frequency signal with the dither signal and for outputting the respective trigger signal, and said means for synchronizing includes means for synchronizing said second signal generator of the first trigger signal and of the second trigger signal with one another at the chronological intervals.

14. The control block as defined in claim 13, wherein said first circuit and said second circuit each include a respective quartz for generating a stable frequency.

15. The control block as defined in claim 13, wherein at least the second circuit has means for receiving a synchronization signal and means operatively connected to said receiving means for varying a phase or a frequency of the dither signal.

16. The control block as defined in claim 12, further comprising a common oil supply for supplying said valves.

17. The control block as defined in claim 12, further comprising valve blocks each having one pilot control valve and one main valve, wherein the pilot control valve is triggerable by a trigger signal.

18. The control block as defined in claim 13, further comprising a synchronization circuit for generating a command for the synchronization.

19. The control block as defined in claim 18, wherein said synchronization circuit is provided in a circuit selected from the group consisting of said first circuit and said second circuit.

20. A mobile driven machine, comprising a control block as defined in claim 12.

* * * * *